US010673796B2

(12) United States Patent
Mohan

(10) Patent No.: US 10,673,796 B2
(45) Date of Patent: Jun. 2, 2020

(54) AUTOMATED EMAIL CATEGORIZATION AND RULE CREATION FOR EMAIL MANAGEMENT

(71) Applicant: Microsoft Technology Licensing, LLC, Redmond, WA (US)

(72) Inventor: Charan Kumbakonam Mohan, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 10 days.

(21) Appl. No.: 15/421,039

(22) Filed: Jan. 31, 2017

(65) Prior Publication Data
US 2018/0219823 A1  Aug. 2, 2018

(51) Int. Cl.
*H04L 12/58* (2006.01)
*G06Q 10/10* (2012.01)
*G06F 16/33* (2019.01)
*G06F 16/35* (2019.01)

(52) U.S. Cl.
CPC ............ *H04L 51/22* (2013.01); *G06F 16/334* (2019.01); *G06F 16/355* (2019.01); *G06Q 10/107* (2013.01); *H04L 51/02* (2013.01)

(58) Field of Classification Search
CPC ......... H04L 51/22; H04L 51/12; H04L 51/14; G06F 17/30675; G06F 17/3071
USPC ......................................................... 709/206
See application file for complete search history.

(56) References Cited

U.S. PATENT DOCUMENTS

| 6,725,228 B1 | 4/2004 | Clark et al. |
| 7,007,067 B1 | 2/2006 | Azvine et al. |
| 7,089,241 B1 * | 8/2006 | Alspector ............ G06Q 10/107 |
| 7,725,544 B2 * | 5/2010 | Alspector ............... H04L 51/12 709/206 |

(Continued)

FOREIGN PATENT DOCUMENTS

| CN | 102576434 A | 7/2012 |
| FR | 2830642 A1 | 4/2003 |
| WO | 0026827 A1 | 5/2000 |

OTHER PUBLICATIONS

"Alerts and Overviews for newly received emails", https://www.msoutlook.info/question/alerts-and-overviews-for-new-emails, Published on Dec. 15, 2015.

(Continued)

*Primary Examiner* — Vivek Srivastava
*Assistant Examiner* — Binod J Kunwar
(74) *Attorney, Agent, or Firm* — Merchant & Gould

(57) ABSTRACT

Automated email categorization and rule creation for email management is provided. An automated filing engine parses an email message for identifying key terms and contextual information for categorizing the email message. Criteria are determined for associating email messages with a particular category. Upon reaching a predetermined threshold, a notification is provided to the email message recipient user, enabling the user to select to allow the automated filing engine to generate a new email folder associated with the category, and to move emails meeting the criteria to the new email folder. The automated filing engine creates a rule based on the criteria, and applies the rule to received email messages, such that email messages meeting the criteria are automatically filed.

19 Claims, 9 Drawing Sheets

(56) References Cited

U.S. PATENT DOCUMENTS

| | | | |
|---|---|---|---|
| 7,961,853 B2 | 6/2011 | Voticky et al. | |
| 8,166,392 B2 | 4/2012 | Horvitz | |
| 8,572,184 B1* | 10/2013 | Cosoi | H04L 51/12 709/206 |
| 8,631,080 B2* | 1/2014 | Goodman | G06Q 10/107 709/206 |
| 8,745,045 B2 | 6/2014 | Bawri et al. | |
| 8,935,190 B2 | 1/2015 | Amoroso et al. | |
| 8,935,768 B1* | 1/2015 | Tyree | G06F 21/6227 706/12 |
| 9,942,184 B2* | 4/2018 | Gaines | H04L 51/02 |
| 9,953,161 B2* | 4/2018 | Ding | G06F 21/554 |
| 2005/0004989 A1 | 1/2005 | Satterfield et al. | |
| 2006/0010217 A1 | 1/2006 | Sood | |
| 2006/0075044 A1 | 4/2006 | Fox et al. | |
| 2006/0248184 A1* | 11/2006 | Wu | H04L 67/24 709/224 |
| 2007/0011258 A1 | 1/2007 | Khoo | |
| 2007/0036301 A1 | 2/2007 | Voticky et al. | |
| 2007/0036306 A1 | 2/2007 | Pines et al. | |
| 2007/0061400 A1* | 3/2007 | Parsons | G06Q 10/107 709/206 |
| 2007/0203997 A1* | 8/2007 | Ingerman | G06Q 10/107 709/206 |
| 2008/0126951 A1 | 5/2008 | Sood et al. | |
| 2009/0006366 A1 | 1/2009 | Johnson et al. | |
| 2009/0125528 A1* | 5/2009 | Choi | G06Q 10/107 |
| 2009/0327430 A1* | 12/2009 | Colvin | G06Q 10/107 709/206 |
| 2010/0017476 A1* | 1/2010 | Shue | G06Q 10/107 709/206 |
| 2010/0057870 A1* | 3/2010 | Ahn | H04L 51/24 709/206 |
| 2010/0082749 A1* | 4/2010 | Wei | G06Q 10/107 709/206 |
| 2010/0153325 A1 | 6/2010 | Amoroso et al. | |
| 2010/0179961 A1 | 7/2010 | Berry et al. | |
| 2010/0205259 A1* | 8/2010 | Vitaldevara | G06Q 10/107 709/206 |
| 2010/0211644 A1 | 8/2010 | Lavoie et al. | |
| 2010/0229246 A1* | 9/2010 | Warrington | G06F 21/6218 726/28 |
| 2010/0325629 A1 | 12/2010 | Fujioka et al. | |
| 2010/0332428 A1 | 12/2010 | Mchenry et al. | |
| 2011/0035451 A1* | 2/2011 | Smith | G06Q 10/107 709/206 |
| 2011/0047228 A1 | 2/2011 | Balasaygun | |
| 2011/0153646 A1 | 6/2011 | Hong et al. | |
| 2012/0143806 A1 | 6/2012 | Sundelin et al. | |
| 2012/0143931 A1 | 6/2012 | Rosenberger et al. | |
| 2012/0149405 A1 | 6/2012 | Bhat | |
| 2012/0150772 A1 | 6/2012 | Paek et al. | |
| 2012/0151380 A1* | 6/2012 | Bishop | G06Q 10/107 715/752 |
| 2012/0215866 A1 | 8/2012 | Satterfield et al. | |
| 2012/0290662 A1 | 11/2012 | Weber et al. | |
| 2013/0111341 A1 | 5/2013 | Bier et al. | |
| 2013/0179516 A1* | 7/2013 | Tsai | G06Q 10/107 709/206 |
| 2014/0280616 A1 | 9/2014 | Ramanathan et al. | |
| 2015/0188870 A1 | 7/2015 | Sharp et al. | |
| 2016/0140222 A1* | 5/2016 | Thapliyal | G06F 17/30722 707/737 |
| 2016/0262128 A1* | 9/2016 | Hailpern | G06F 17/00 |
| 2017/0032320 A1* | 2/2017 | Huang | G06Q 10/107 |

OTHER PUBLICATIONS

"CiearContext Inbox Manager for Microsoft Outlook: Designing a More Effective Inbox", Retrieved From: http://www.clearcontext.com/resources/attachments/Designing_a_More_Effective_Inbox.pdf, Mar. 2004, 4 Pages.

"Empty a Folder in Yahoo Mail", Retrieved From: https://web.archive.org/web/20120302061524/http://www.freeemailtutorials.com/yahooMailTutorials/emptyTrashSpamAndOtherEmailFolders.php, 3 Pages.

"Machine translation of Description portion of FR 2830642", Retrieved From: http://translationportal.epo.org/emtp/translate?ACTION=description-retrieval&COUNTRY=FR&ENGINE=google&FORMAT=docdb&KIND=A1&LOCALE=en_EP&NUMBER=2830642&0PS=ops.epo.org/3.1&SRCLANG=fr&TRGLANG=en&PD=true&PDFboth=true, Translated On: Jun. 4, 2015, 22 Pages.

"Scrollbar", Retrieved From: https://en.wikipedia.org/w/index.php?title=Scrollbar&oldid=471607303, Jan. 16, 2012, 4 Pages.

"SpamAssassin as a Learning System", Retrieved From: https://web.archive.org/web/20120229163852/http://commons.oreilly.com/wiki/index.php/SpamAssassin/SpamAssassin_as_a_Learning_System, Archived on: Feb. 29, 2012, 12 Pages.

"Toolbar", Retrieved From: https://en.wikipedia.org/w/index.php?title=%20Toolbar&oldid=477231824, Feb. 16, 2012, 2 Pages.

"Xiant Filer User Guide", Retrieved From: https://web.archive.org/web/20090704151017/http://www.xiant.com:80/filer/XiantFilerUserGuide.pdf, Jun. 11, 2009, 12 Pages.

"Final Office Action Issued in U.S Appl. No. 13/804,914", dated Nov. 27, 2015, 30 Pages.

"Final Office Action Issued in U.S. Appl. No. 13/804,914", dated Sep. 15, 2017, 21 Pages.

"Non Final Office Action Issued in U.S. Appl. No. 13/804,914", dated Mar. 3, 2017, 24 Pages.

"Non Final Office Action Issued in U.S. Appl. No. 13/804,914", dated Apr. 10, 2015, 21 Pages.

"Office Action Issued in European Patent Application No. 14713703.8", dated Sep. 26, 2017, 5 Pages.

"Supplemental Search Report Issued in European Patent Application No. 14713703.8", dated Oct. 26, 2016, 8 Pages.

"Office Action Issued in Chinese Patent Application No. 201480015204.0", dated Jun. 5, 2018, 12 Pages.

Doug, Aberdeen, "Official Gmail Blog: Email overload? Try Priority Inbox", Retrieved From: https://gmail.googleblog.com/2010/08/email-overload-try-priority-inbox.html, Aug. 30, 2010, 3 Pages.

Fleming, Michael, et al., "User Modeling in the Design of Interactive Interface Agents", In Proceedings of the seventh international conference on User modeling, UM '99, Jun. 20, 1999, 10 Pages.

Forsyth, et al., "Strategies to Reduce Email Overload", In Proceedings of 2009 International Conference on Computer Engineering and Applications, IPCSIT vol. 2, 2011, 7 Pages.

Maes, "Agents That Reduce Work and Information Overload", Communications of the ACM, vol. 37, No. 7, Jul. 1994, pp. 30-40.

Neustaedter, et al., "The Social Network and Relationship Finder: Social Sorting for Email Triage", Retrieved From: In Conference on E-mail and Anti-Spam, Jul. 1, 2005, 8 Pages.

"International Search Report & Written Opinion for PCT Patent Application No. PCT/US2014/021455", dated Sep. 25, 2014, 10 Pages.

Sanchez, Julio, et al., "Software Solutions for Engineers and Scientists", In CRC Press, Oct. 18, 2007, 47 Pages.

Schumacher, Frederick W., "Email Visualization Strategies to Support Task Management", In Essay Submitted in Partial Fulfilment of the Requirements for the Degree of Master of Science in Information Systems, Nov. 13, 2007, 52 Pages.

Tsugawa, et al., "Robust Estimation of Message Importance using Inferred Inter-Recipient Trust for Supporting Email Triage", In Proceedings of 2010 10th IEEE/IPSJ International Symposium on Applications and the Internet, Jul. 19, 2010, 4 Pages.

"Second Office Action Issued in Chinese Patent Application No. 201480015204.0", dated Feb. 22, 2019, 20 Pages.

"Non Final Office Action Issued in U.S. Appl. No. 13/804,914", dated Apr. 11, 2019, 25 Pages.

"Final Office Action Issued in U.S. Appl. No. 13/804,914", dated Jul. 30, 2019, 30 Pages.

"Non Final Office Action Issued in U.S. Appl. No. 13/804,914", dated Nov. 7, 2019, 31 Pages.

(56) References Cited

OTHER PUBLICATIONS

"Final Office Action Issued in U.S. Appl. No. 13/804,914", dated Feb. 18, 2020, 31 Pages.

* cited by examiner

FIG. 3A

MOBILE COMPUTING DEVICE

AUTOMATED EMAIL CATEGORIZATION AND RULE CREATION FOR EMAIL MANAGEMENT

BACKGROUND

An electronic mail application is a useful communication tool. However, many users feel overwhelmed by the amount of email messages that they receive and the need to act on received messages. Oftentimes, as the number of email messages a user receives increases, the user's ability to efficiently organize messages becomes progressively more challenging. Some users may accumulate email messages in an inbox folder, and must scour through their entire inboxes to find a particular email item. As can be appreciated, this can be inefficient and time-consuming. Some users set up a filing system to manage their email messages. For example, a user may set up folders that may relate to broad categories or to particular projects. When an email message arrives in a user's inbox, the user may manually file the message in an appropriate folder. Other users may establish rules that sort email messages into particular folders as they come in. Currently, email organization requires manual work on behalf of the user (e.g., filing emails, creating rules), which does not allow for a maximization of user productivity and efficiency.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for providing automated email categorization and rule creation for email management. An automated filing engine is provided for parsing email messages for identifying key terms and contextual information for categorizing the email messages. Criteria are determined for associating email messages with a particular category. When a determination is made to associate one or more email messages with a particular category, a notification is provided to the email message recipient user, enabling the user to select to allow the automated filing engine to generate a new email folder associated with the category and to move emails meeting the criteria to the new email folder. The automated filing engine creates a rule based on the criteria for associating email messages with a particular category. The rule is applied to incoming email messages. When an email message meets the rule based on the criteria, the email messages are automatically moved to the associated email folder.

Advantageously, computer processing efficiency is increased by providing more efficient user interaction with email messages. For example, by providing automatic folder generation and email categorization, email messages are automatically grouped into contextually-relevant folders, and manual searches for email messages can be lessened. Further, by automatically filing email messages, the number of messages in the user's inbox is reduced, which can reduce user stress and increase user interaction performance.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 3A is an illustration of an example user interface display showing an example pop-up notification for categorizing emails;

DETAILED DESCRIPTION

Figure 1:
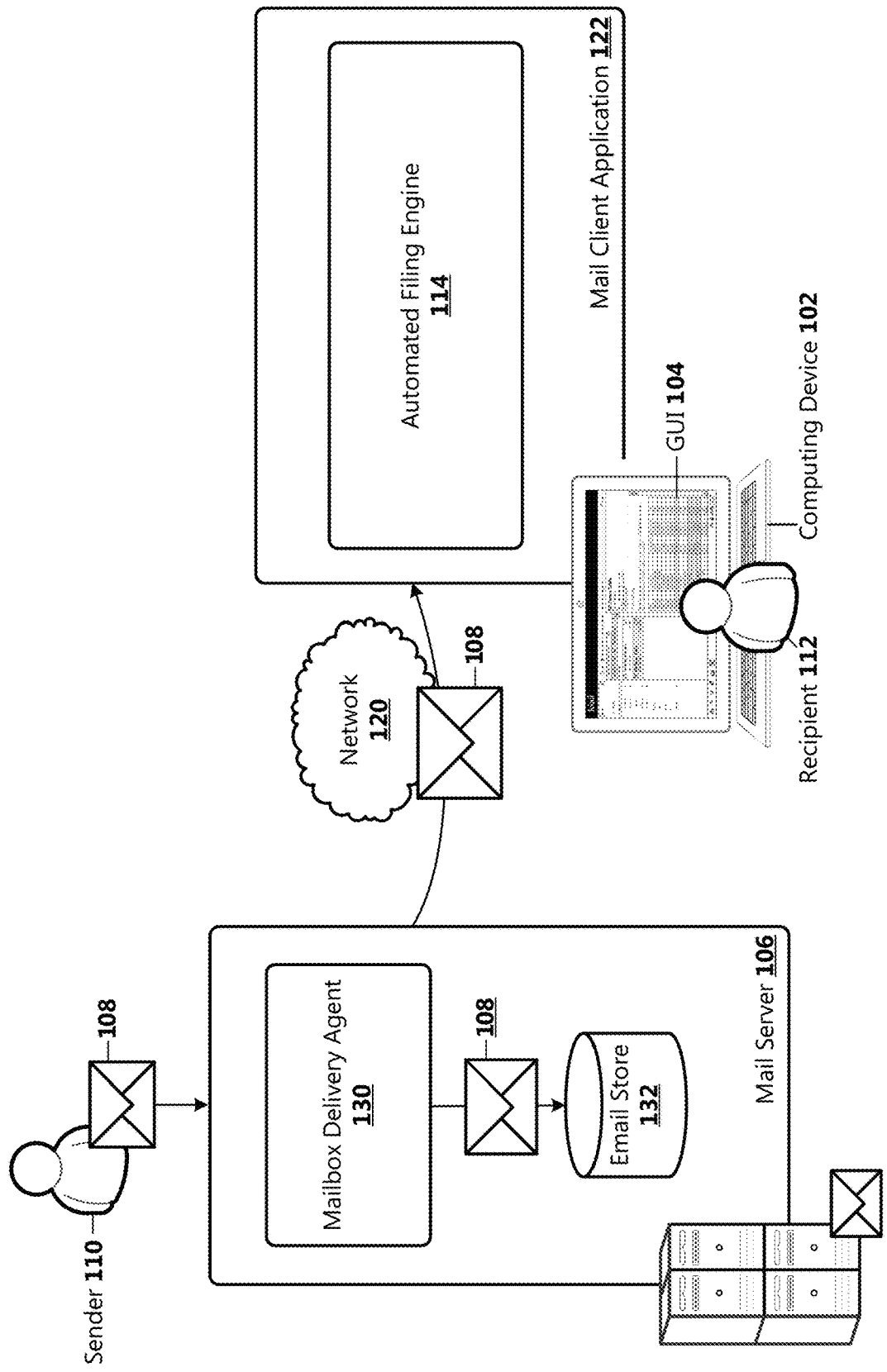
FIG. 1 is a block diagram showing an example operating environment including components of a system for providing automated rule creation for email management.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for providing automated email categorization and rule creation for email management. With reference now to FIG. 1, a block diagram of one example operating environment 100 including an automated filing engine 114 is shown. As illustrated, the example environment 100 includes a computing device 102. The computing device 102 illustrated in FIG. 1 is illustrated as a laptop computer; however, as should be appreciated, the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications for performing a variety of tasks. The hardware of these computing devices is discussed in greater detail in regard to FIGS. 5, 6A, 6B, and 7.

A user may utilize an application on the computing device 102 for a variety of tasks, which may include, for example, to write, calculate, draw, take and organize notes, organize, prepare presentations, send and receive electronic mail, browse web content, make music, and the like. According to examples, the computing device 102 is operative to execute a mail client application 122. The user may utilize the mail client application 122 executing on the computing device 102 to receive, view, interact with, compose, or generate electronic messages 108, such as emails, meeting requests, or other types of electronic messages. According to an aspect, the mail client application 122 uses a standard protocol for receiving and sending electronic messages.

In some examples, the mail client application 122 is a thick client application, which is stored locally on the computing device 102. In other examples, the mail client application 122 is a thin client application (i.e., web application) that resides on a remote server and is accessible over a network 120, such as the Internet or an intranet. A thin mail client application 122 may be hosted in a browser-controlled environment or coded in a browser-supported language and reliant on a common web browser to render the application executable on the computing device 102. According to examples, a graphical user interface (GUI) 104 is provided by the mail client application 122 for enabling the user to interact with functionalities of the application and with electronic messages 108 through manipulation of graphical icons, visual indicators, and the like.

According to an aspect, a mail server 106 is operative to receive incoming electronic messages 108 from a sending user 110, and forward outgoing electronic messages 108 for delivery to a recipient user 112. In some examples, the mail server 106 is operative to transmit an electronic message 108 to one or more intended recipients by routing the electronic message 108 to one or more mailbox delivery agents 130. The mail server 106 includes or is communicatively attached to a plurality of mailbox delivery agents 130, wherein each mailbox delivery agent 130 is connected to a user's mailbox or email store 132 from which the mail client application 122 is operative to retrieve electronic messages 108, for example, over a network 120. According to an aspect, the email store 132 is illustrative of a database in which the recipient user's electronic messages 108 are stored. In some examples, the email store 132 is located locally on the computing device 102. In other examples, the email store 132 is located on a remote server and is accessible over a network 120.

As illustrated in FIG. 1, the mail client application 122 includes or is in communication with the automated filing engine 114, illustrative of a software module, system, or device operative to provide automated rule creation for email management. In one example, the computing device 102 includes a display state application programming interface (API), operative to enable the mail client application 122 executing on the computing device 102 to employ the systems and methods of the present disclosure via stored instructions. In another example, the mailbox delivery agent 130 includes or is in communication with the automated filing engine 114, wherein methods performed by aspects of the automated filing engine are executed on the mail server 106.

Figure 2:
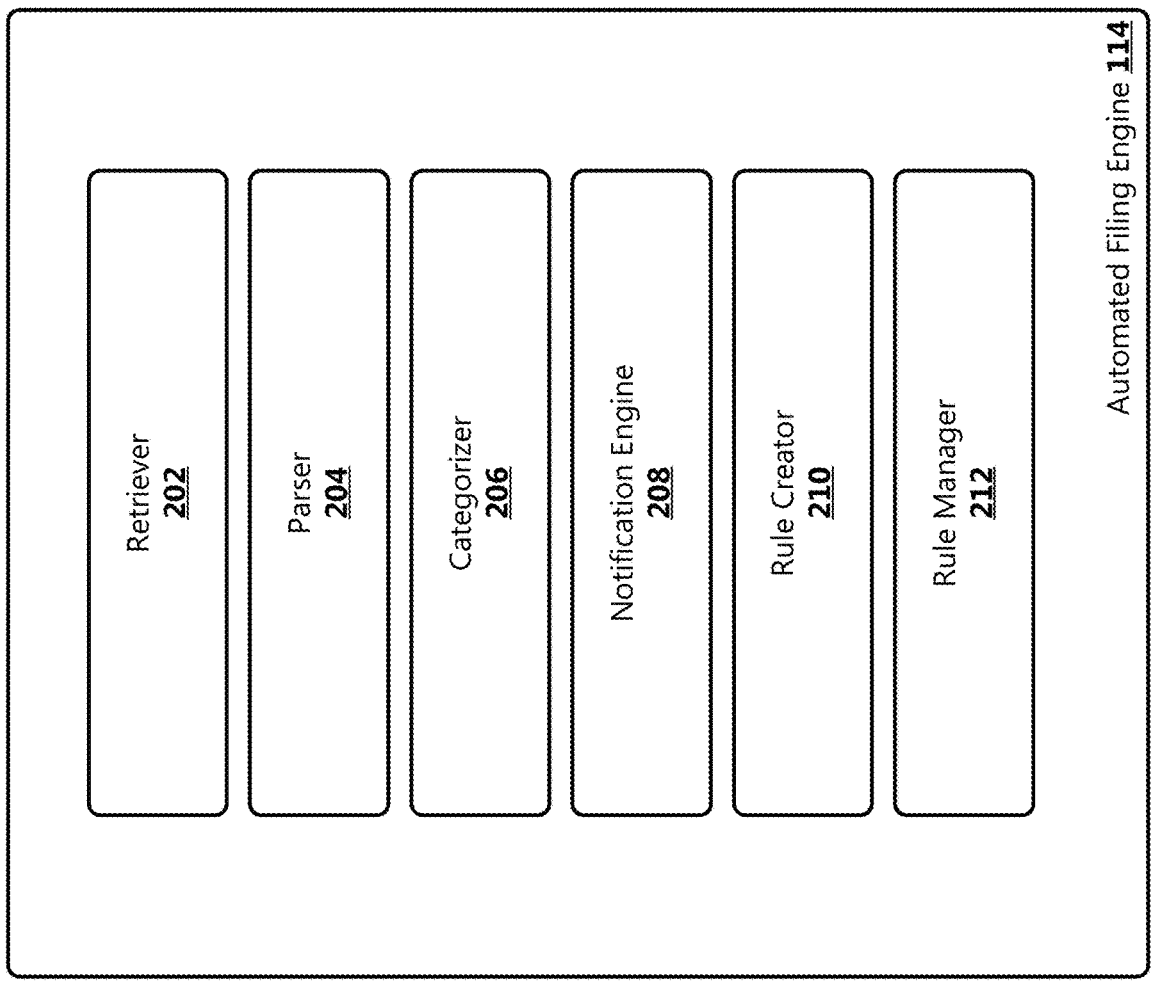
FIG. 2 is a block diagram showing components of an automated filing engine.

With reference now to FIG. 2, various components of the automated filing engine 114 are illustrated. As should be understood, although each component of the automated filing engine 114 is illustrated singularly, the components may be combined in one or a combination of components, and each component may include a plurality of components. According to an aspect, the automated filing engine 114 includes a retriever 202, a parser 204, a categorizer 206, a notification engine 208, a rule creator 210, and a rule manager 212.

The retriever 202 is illustrative of a software module, system, or device operative to retrieve email messages 108 from the email store 132. According to an example, retrieval of an email message 108 includes a request for the email message and a response to the request. In some examples, the retriever 202 retrieves an email message 108 when the email message is received in the email store 132. In other examples, the retriever 202 retrieves one or more email messages 108 according to a predetermined schedule or time interval, or based on a number of email messages received or a number of email messages to process.

The parser 204 is illustrative of a software module, system, or device operative to parse a retrieved email message 108 to identify context information associated with the email message. According to an example, the parser 204 parses textual content in one or more of: the body of the email message 108, the header (e.g., the subject, the sender, the recipients) of the email message, the signature of the email message, and attachments associated with the email message. According to an aspect, the parser 204 utilizes natural language processing and machine learning for identifying key terms or key term synonyms within the textual content. The parser 204 is further operative to index identified key terms, and associate the identified key terms with the email message 108 from which the key terms are parsed.

According to an aspect, key terms are utilized for determining a relatedness of an email message 108 to a category. For example, a plurality of email messages 108 may include a key term "travel" or other key terms related to travel (e.g., "flight itinerary," "car rental," "hotel reservation," "boarding pass"). The key term or other key terms may be parsed from one or more parts of the email messages 108, such as the email body, the header, the signature, or attachments. In some examples, the parser 204 is operative to parse a plurality of email messages 108 for identifying other contextual information, such as sender 110, receivers (recipient users 112), date information, etc. The other contextual information may be utilized in addition to key terms for determining a relatedness of an email message 108 to a category. Accordingly, the parser 204 is operative to parse the plurality of email messages 108, identify the key term "travel" and related key terms, and index the email message and identified terms and contextual information.

The categorizer 206 is illustrative of a software module, system, or device operative to determine one or more categories to associate with an email message 108. In some examples, a category is determined based on identified key terms. For example, when a particular key term is identified in a plurality of email messages 108, the particular key term may be determined to be a category that email messages can be categorized under. In some examples, the category associated with an email message 108 is or includes an identified key term. In other examples, the category associated with an email message 108 is or includes a term related to an identified key term. According to one aspect, the categorizer 206 is operative to categorize email messages 108 based on one or a combination of: key terms, related terms, senders 110, receivers (recipient users 112), and dates.

According to an example, the categorizer 206 is operative to determine a confidence score representing the relatedness of an email message 108 to a particular category. For example, the confidence score may be based on frequency of use of a particular key term or related terms, the part of the email message 108 from where a particular key term or related terms are parsed, or based on a combination of parsed key terms or related terms and contextual information. In some examples, a category is determined when a number of email messages 108 that meet or exceed a certain confidence score reach a predetermined threshold. Further, the categorizer 206 is operative to generate a listing of email messages 108 associated with a particular category. According to an example, when an email message 108 is associated with more than one category, the email message is included in more than one listing of email messages associated with a category, and can be filed in more than one folder.

The notification engine 208 is illustrative of a software module, system, or device operative to generate a notification for notifying the recipient user 112 of email messages 108 that have been associated with a particular category as determined by the categorizer 206. In some examples, the notification engine 208 generates a notification that requests permission from the recipient user 112 to allow the automated filing engine 114 to generate a folder associated with the particular category, and to move one or more of the email messages 108 that have been associated with the particular category to the folder. According to an aspect, the notification engine 108 is further operative to receive a selection from the recipient user 112. For example, the recipient user 112 may select to allow the automated filing engine 114 to generate a folder associated with the particular category, and to move one or more of the email messages 108 that have been associated with the particular category to the folder. In some examples, the notification includes a selection for automatically filing incoming email messages 108 meeting certain criteria to the folder. Upon receiving a selection to automatically file incoming email messages 108 meeting certain criteria to the folder, the rule creator 210, illustrative of a software module, system, or device, generates a rule based on criteria associated with the email messages 108 associated with the particular category. For example, the rule creator 210 is operative to generate a rule including an instruction to move a received email message 108 meeting the certain criteria to the folder. In some examples, the rule includes an instruction to notify the recipient user 108 when an email message 108 meeting the certain criteria is received.

The rule manager 212 is illustrative of a software module, system, or device operative to apply the generated rule to incoming email messages 108. Accordingly, when an email message 108 is received, the rule manager 212 analyzes the email message for determining whether the criteria associated with the rule is met. When the criteria associated with the rule is met, the rule manager 212 automatically moves the email message 108 to the associated folder. In some examples, the rule manager 212 generates a notification to the recipient user 112, informing the user of the move. In some examples, the notification includes an undo selector, which when selected, moves the moved email message 108 back to the user's inbox. According to an example, when a received email message 108 meets criteria associated with more than one rule, copies of the email message can be stored in multiple folders.

Figure 3A:
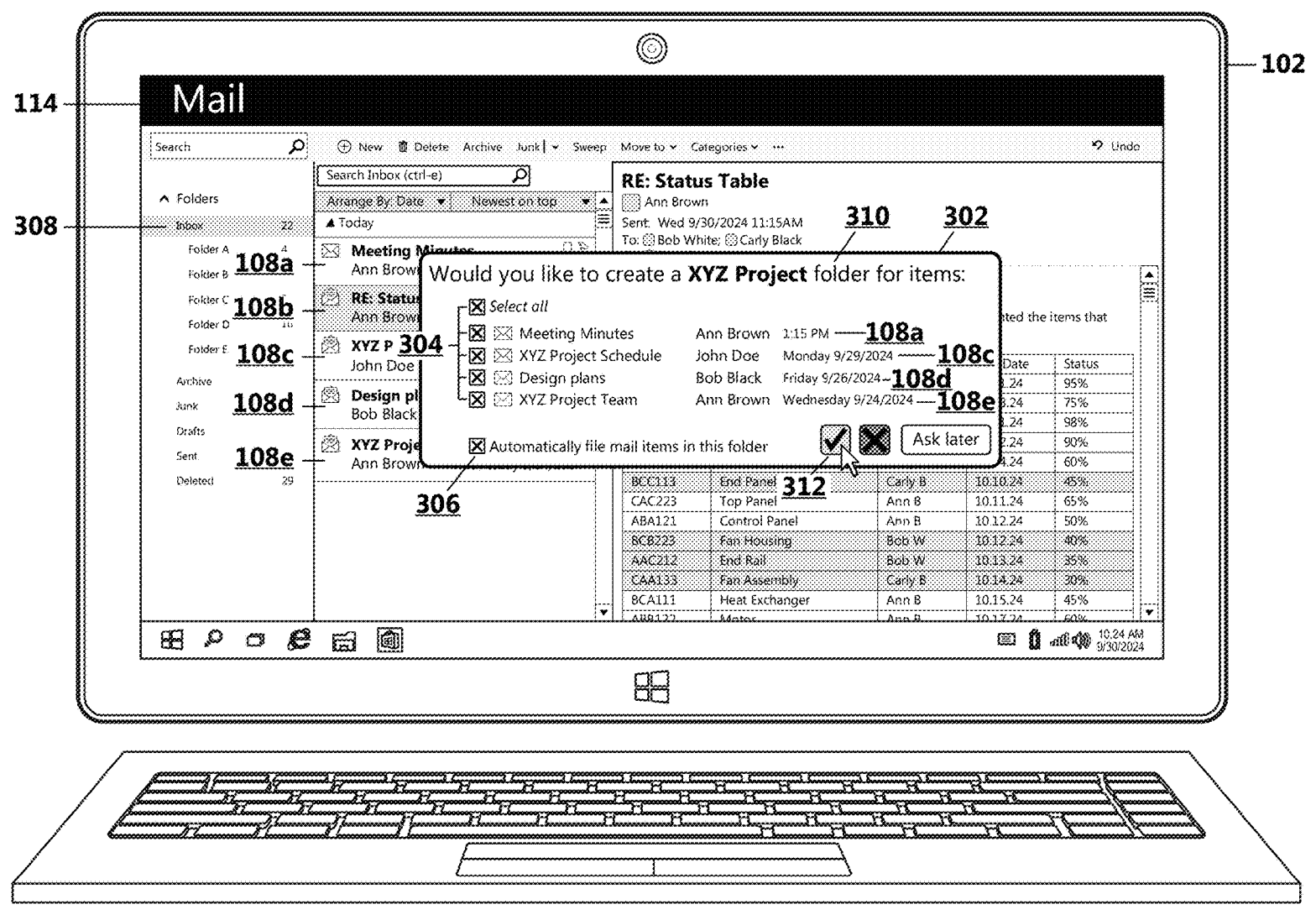
Figure 3B:
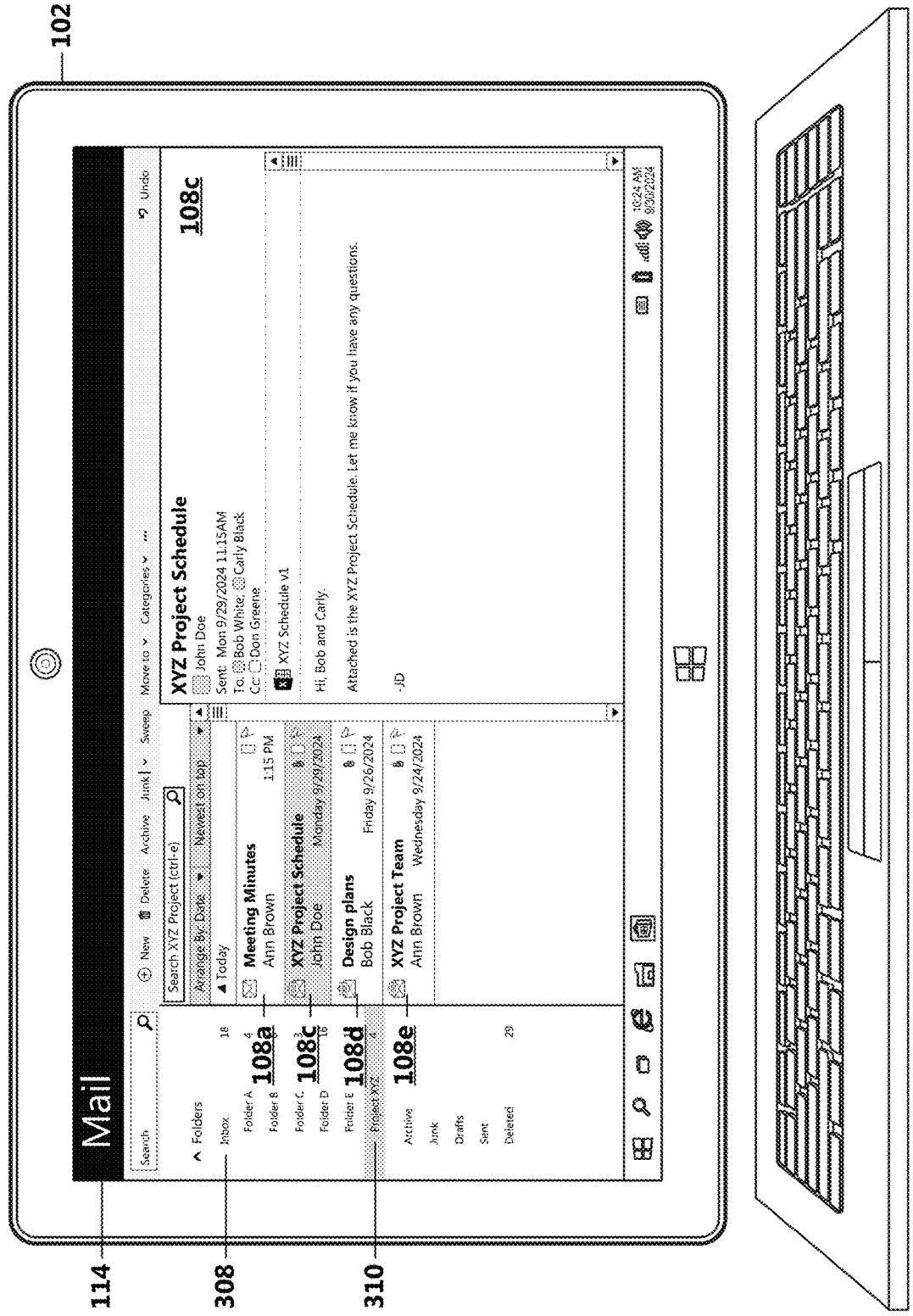
FIG. 3B is an illustration of an example user interface display showing an addition of a folder comprising automatically categorized emails.

Example interfaces showing aspects of the automated filing engine 114 are described with respect to FIGS. 3A and 3B. With reference now to FIG. 3A, an example email application GUI 104 is provided by the mail client application 122 and displayed by the computing device 102. The example email application GUI 104 includes a display of a plurality of electronic messages 108a-e in the recipient user's inbox 308 and a display of an example notification 302. As illustrated, the example notification 302 includes text informing the recipient user 112 of specific email messages 108a,c,d,e that meet certain criteria for being associated with a particular category, "XYZ Project," and a selectable option 312 for enabling the recipient user 112 to allow the automated filing engine 114 to file one or more of the specific email messages 108a,c,d,e to an "XYZ Project" folder 310. As illustrated, the recipient user 112 is shown selecting an option 306 for allowing the automated filing engine 114 to automatically move future-received email messages 108 that meet the same criteria that caused the specific email messages 108a,c,d,e to be associated with the "XYZ Project" category to the "XYZ Project" folder 310. According to an example, selection of the option 306 causes the rule creator 210 to generate a rule to be utilized by the rule manager 212 to analyze received email messages 110, and to automatically move messages that meet the certain criteria associated with the "XYZ Project" category emails 108a,c,d,e to the "XYZ Project" folder 310.

With reference now to FIG. 3B, upon selection of the option 306, the email messages 108a,c,d,e associated with the "XYZ Project" category are moved to the "XYZ Project" folder 310. As illustrated in FIG. 3B, the "XYZ Project" folder 310 is selected, and the email messages 108a,c,d,e associated with the "XYZ Project" category are shown displayed in the folder.

Figure 4:
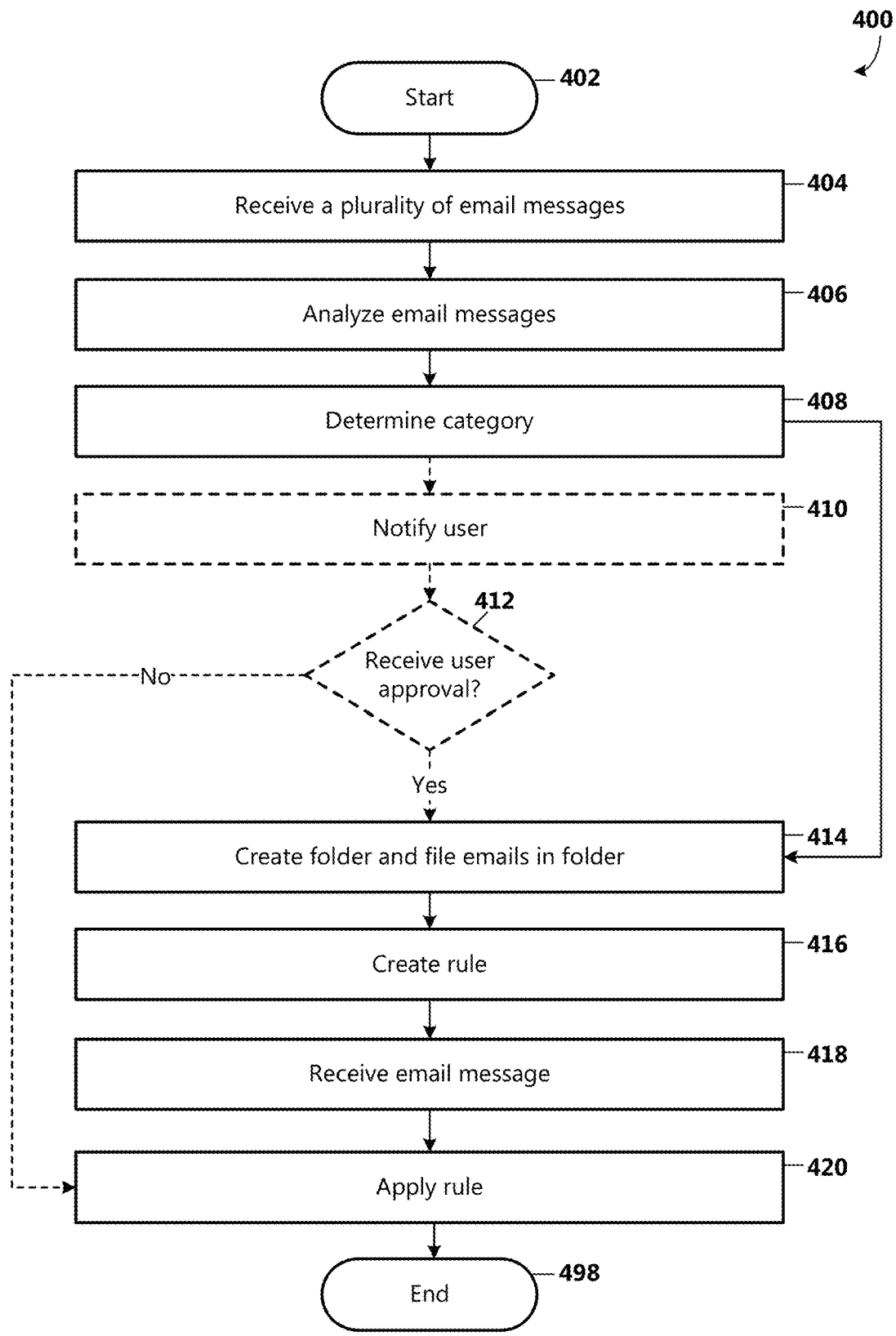
FIG. 4 is a flow chart showing general stages involved in an example method for providing automated rule creation for email management.

Having described an operating environment and various user interface display examples with respect to FIGS. 1-3B, FIG. 4 is a flow chart showing general stages involved in an example method 400 for providing automated rule creation for email management. With reference now to FIG. 4, the method 400 begins at start OPERATION 402, and proceeds to OPERATION 404, where a plurality of email messages 108 are received. According to an example, the email messages 108 may be received over a period of time.

The method 400 proceeds to OPERATION 406, where the retriever 202 retrieves one or more email messages 108 for analysis by the parser 204. In some examples, the retriever 202 retrieves messages according to a predetermined schedule or time interval, or based on a number of email messages received or a number of email messages to process. Further at OPERATION 406, the parser 204 parses various parts of the retrieved email messages 108 to identify context information associated with the email messages. For example, the parser 204 parses at least one of the email body, the header, the signature, and attachments for key terms, related terms, or other contextual information for associating the email message 108 with one or more categories. Further, the parser 204 indexes identified key terms and contextual information.

The method 400 proceeds to OPERATION 408, where the categorizer 206 determines one or more categories to associate with the email messages 108. For example, the categorizer 206 determines confidence scores representing the relatedness of an email message 108 to a particular category, and then determines one or more categories to associate with the email message 108 when a predetermined number of email messages that meets or exceeds a particular confidence score for a particular category is identified.

The method 400 optionally proceeds to OPERATION 410, where the automated filing engine 114 optionally requests user-approval to generate a new folder 310 associated with a determined category, and to move one or more selected email messages 108 associated with the determined category to the folder 310.

The method 400 optionally proceeds to DECISION OPERATION 412, where a determination is made as to whether user-approval is received. When a determination is made that user-approval is received, or after OPERATION 408 when user-approval is not requested, the method 400 proceeds to OPERATION 414, where a new folder 310 is created, and one or more selected email messages 108 associated with the determined category are moved to the created folder 310.

The method 400 proceeds to OPERATION 416, where the rule creator 210 generates a rule based on the criteria used to categorize the one or more selected email messages 108. In some examples, the rule is generated in response to receiving a user selection to automatically file or notify the recipient user 112 of new email messages 108 that meet certain criteria.

At OPERATION 418, a new email message 108 is received, and at OPERATION 420, the generated rule is applied against the new email message 108 for determining whether the new email message 108 meets the criteria associated with the rule. For example, when the new email message 108 meets the criteria (e.g., comprises certain key terms, related terms, or context information), the email message 108 is automatically moved to a folder 310 associated with the rule. In some examples, a notification 302 is generated and displayed to the recipient user 112 for notifying the user of a folder 310 to which the automated filing engine 114 recommends to move the new email message 108. The method 400 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, eystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
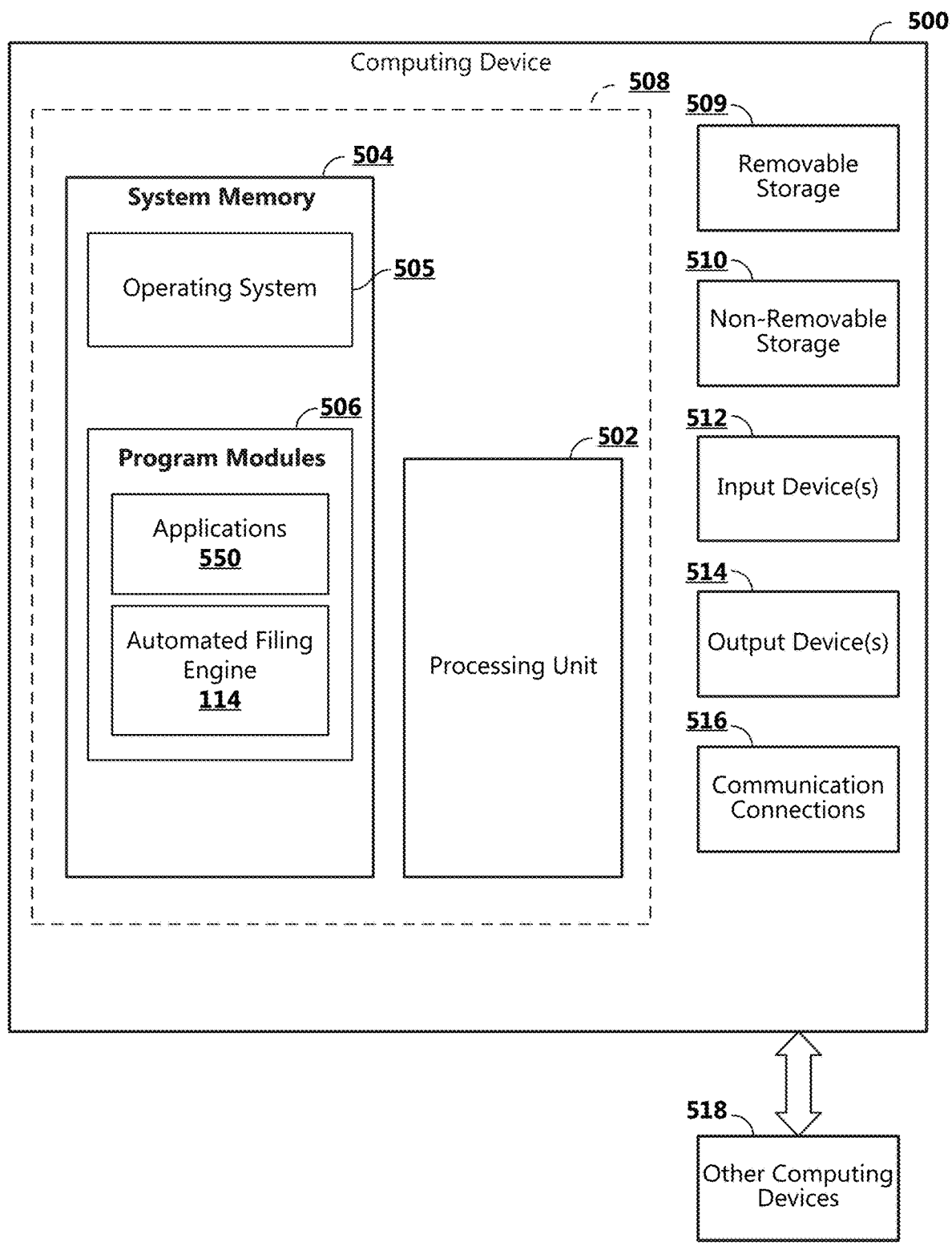
FIG. 5 is a block diagram illustrating example physical components of a computing device.
Figure 6A:
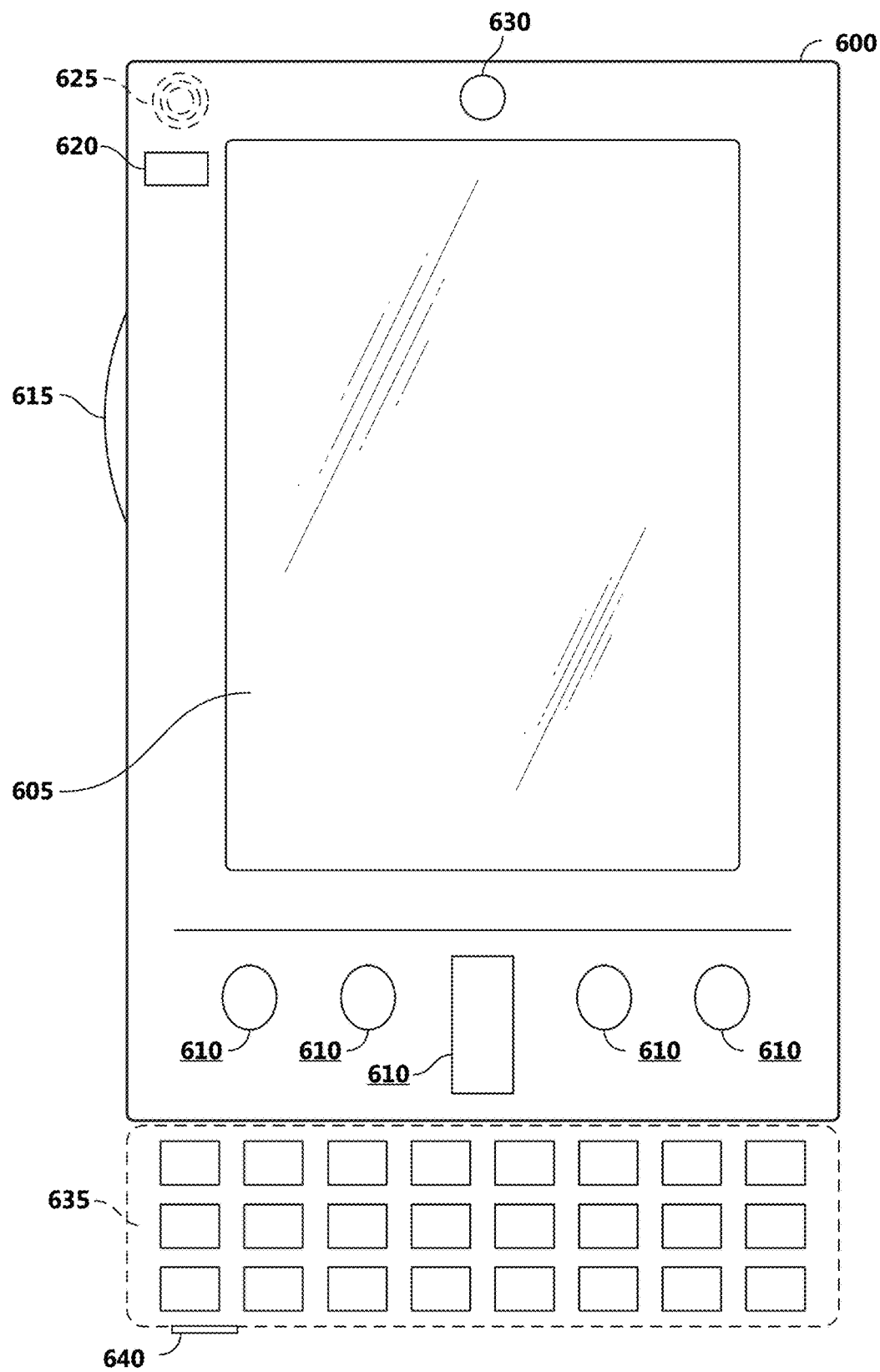
FIGS. 6A and 6B are block diagrams of a mobile computing device.
Figure 6B:
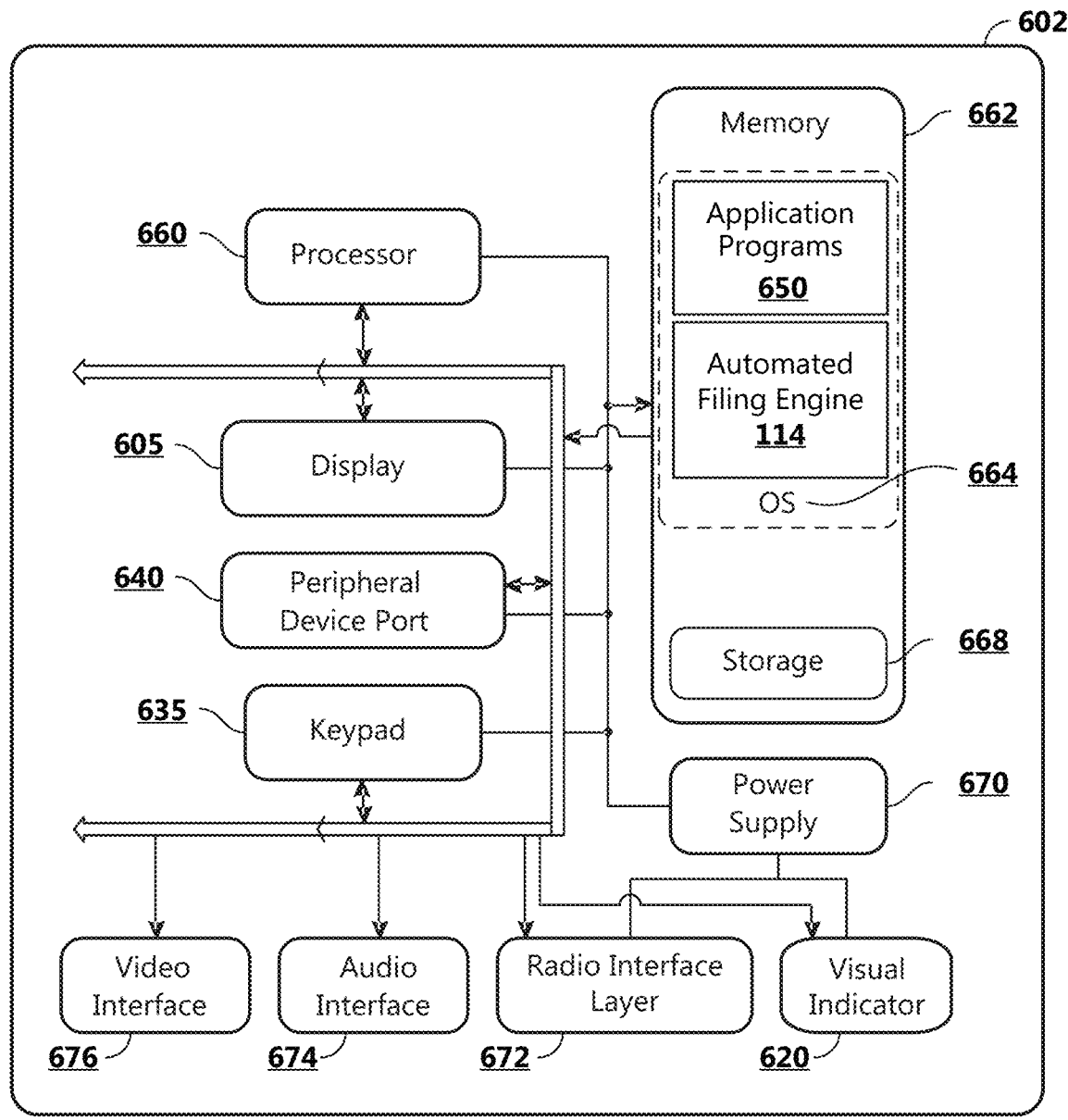
Figure 7:
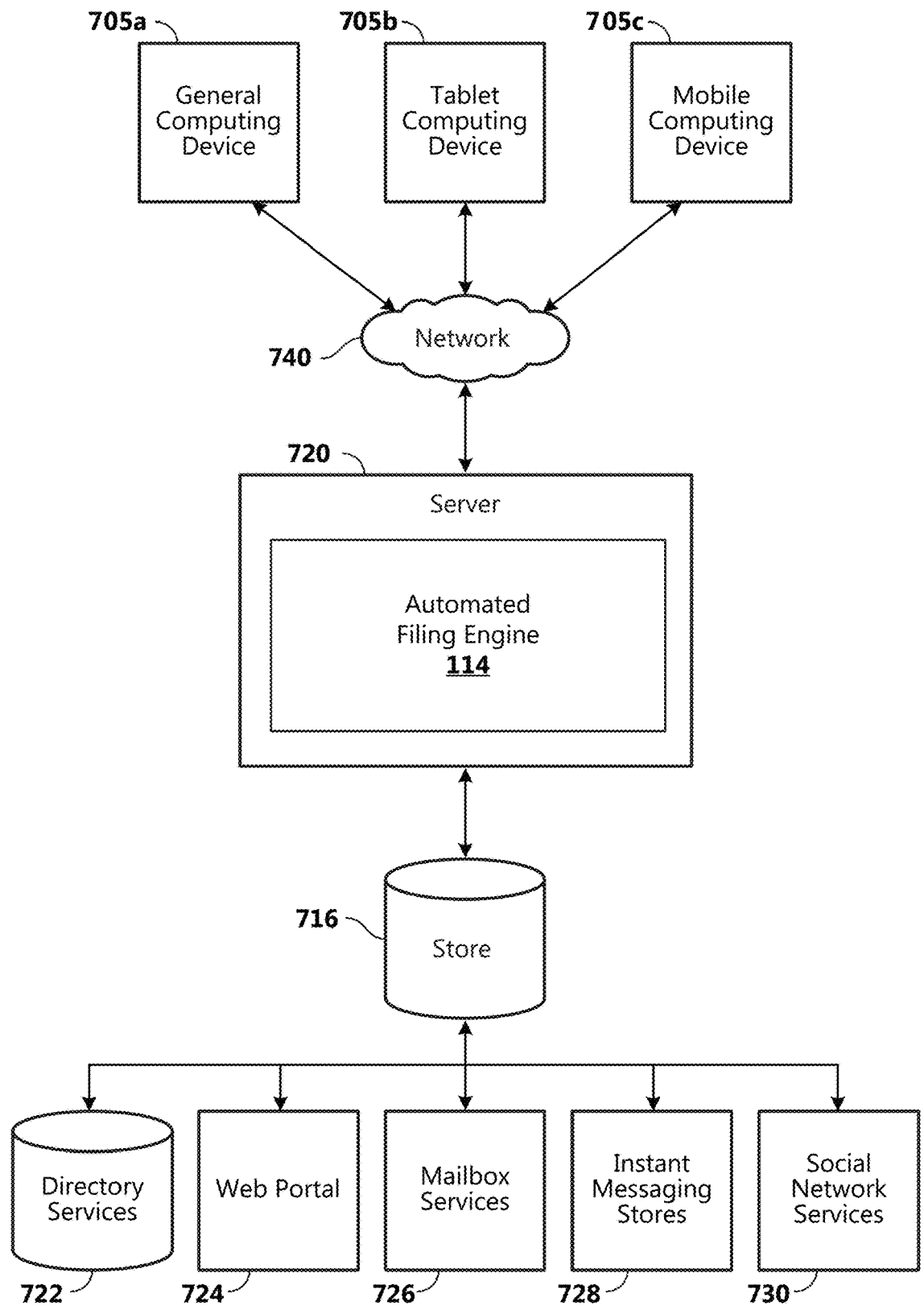
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the automated filing engine 114. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., automated filing engine 114) perform processes including, but not limited to, one or more of the stages of the method 400 illustrated in FIG. 4. According to an aspect, other program modules are used in accordance with examples and include applications 550 such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the automated filing engine 114 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries.

According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing automated rule creation for email management as described above. Content developed, interacted with, or edited in association with the automated filing engine 114 is enabled to be stored in different communication channels or other storage types. For example, various documents may be stored using a directory service 722, a web portal 724, a mailbox service 726, an instant messaging store 728, or a social networking site 730. The automated filing engine 114 is operative to use any of these types of systems or the like for providing automated rule creation for email management, as described herein. According to an aspect, a server 720 provides the automated filing engine 114 to clients 705a,b,c. As one example, the server 720 is a web server providing the automated filing engine 114 over the web. The server 720 provides the automated filing engine 114 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A computer-implemented method for providing automated email categorization, comprising:
receiving a plurality of email messages in a recipient user's inbox of an email application;
parsing the plurality of email messages to identify criteria for categorizing the plurality of email messages;
determining a category to associate with one or more of the plurality of email messages based on the criteria;
determining a number of the plurality of email messages associated with the category satisfies a threshold;
in response to the threshold being satisfied, providing a notification for display on a user interface of the email application, the notification including a first option to generate an email folder for the category, and the notification also including a second option to allow incoming email messages meeting the criteria to be automatically filed in the email folder;
responsive to the recipient user's selection of the first option:
generating the email folder for the category; and
moving one or more of the plurality of email messages meeting the criteria to the email folder; and
responsive to the recipient user's selection of the second option and a receipt of a new email message meeting the criteria in the recipient user's inbox, automatically filing the new email message in the email folder.

2. The computer-implemented method of claim 1, wherein parsing the plurality of email messages to identify the criteria comprises parsing the plurality of email messages for:
   key terms;
   related terms; and
   contextual information.

3. The computer-implemented method of claim 1, wherein determining the category comprises:
   identifying one or more key terms, related terms, and contextual information in the plurality of email messages;
   indexing the identified one or more key terms, related terms, and contextual information in association with an email message of the plurality of email messages from which the one or more key terms, related terms, and contextual information are identified;
   determining a recurrence of a particular key term or terms related to the particular key term, or a combination of the particular key term, terms related to the particular key term and contextual information; and
   determining the category based on the particular key term.

4. The computer-implemented method of claim 3, wherein determining the category to associate with the one or more of the plurality of email messages based on the criteria comprises:
   assigning a confidence score for each email message of the plurality of email messages, the confidence score representing a relatedness of the email message to the category; and
   determining to associate the email message with the category when the confidence score meets or exceeds a predetermined confidence score.

5. The computer-implemented method of claim 1, further comprising:
   generating the notification to be provided for display, the notification further including the category and a listing of email messages associated with the category, wherein the first option further enables the recipient user to select one or more email messages from the listing to file in the email folder; and
   responsive to the recipient user's selection to file the one or more email messages from the listing to the email folder, moving the one or more email messages to the email folder.

6. The computer-implemented method of claim 1, further comprising:
   responsive to the recipient user's selection of the second option to allow incoming email messages meeting the criteria to be automatically filed in the email folder:
      creating a rule to move incoming email messages meeting the criteria to the email folder; and
      applying the rule.

7. The computer-implemented method of claim 1, wherein parsing the plurality of email messages to identify the criteria for categorizing the plurality of email messages comprises parsing one or more parts of the plurality of email messages, the one or more parts of the plurality of email messages comprising:
   an email body;
   a header;
   a signature; and
   an attachment.

8. A system for providing automated email categorization, the system comprising:
   at least one processing device; and
   at least one computer readable data storage device storing instructions that, when executed by the at least one processing device, cause the system to:
      parse a plurality of email messages in a recipient user's inbox of an email application to identify criteria for categorizing the plurality of email messages;
      determine a category to associate with one or more of the plurality of email messages based on the criteria;
      determine a number of the plurality of email messages associated with the category satisfies a threshold;
      in response to the threshold being satisfied, provide a notification for display on a user interface of the email application, the notification including a first option to generate an email folder for the category, and the notification also including a second option to allow incoming email messages meeting the criteria to be automatically filed in the email folder;
      responsive to the recipient user's selection of the first option:
         generate the email folder for the category; and
         move one or more of the plurality of email messages meeting the criteria to the email folder; and
      responsive to the recipient user's selection of the second option and a receipt of a new email message meeting the criteria in the recipient user's inbox, automatically file the new email message in the email folder.

9. The system of claim 8, wherein in parsing the plurality of email messages to identify the criteria, the system is operative to parse the plurality of email messages for:
   key terms;
   related terms; and
   contextual information.

10. The system of claim 8, wherein in determining the category, the system is operative to:
   identify one or more key terms, related terms, and contextual information in the plurality of email messages;
   index the identified one or more key terms, related terms, and contextual information in association with an email message of the plurality of email messages from which the one or more key terms, related terms, and contextual information are identified;
   determine a recurrence of a particular key term or terms related to the particular key term, or a combination of the particular key term, terms related to the particular key term and contextual information; and
   determine the category based on the particular key term.

11. The system of claim 10, wherein in determining the category to associate with the one or more of the plurality of email messages based on the criteria, the system is operative to:
   assign a confidence score for each email message of the plurality of email messages, the confidence score representing a relatedness of the email message to the category; and
   associate the email message with the category when the confidence score meets or exceeds a predetermined confidence score.

12. The system of claim 8, wherein the system is further operative to:
   generate the notification to be provided for display, the notification further including the category and a listing of email messages associated with the category, wherein the first option further enables the recipient user to select one or more email messages from the listing to file in the email folder; and responsive to the recipient user's selection to file the one or more email messages from the listing to the email folder, move the one or more email messages to the email folder.

13. The system of claim 8, wherein the system is further operative to:
responsive to the recipient user's selection of the second option to allow incoming email messages meeting the criteria to be automatically filed in the email folder:
create a rule to move incoming email messages meeting the criteria to the email folder; and
apply the rule.

14. The system of claim 8, wherein in parsing the plurality of email messages to identify the criteria for categorizing the plurality of email messages comprises parsing at least one of:
an email body;
a header;
a signature; and
an attachment.

15. A computer readable storage device including computer readable instructions, which when executed by a processing unit is operative to:
parse a plurality of email messages in a recipient user's inbox of an email application to identify criteria for categorizing the plurality of email messages;
determine a category to associate with one or more of the plurality of email messages based on the criteria;
determine a number of the plurality of email messages associated with the category satisfies a threshold;
in response to the threshold being satisfied, provide a notification for display on a user interface of the email application, the notification including a first option to generate an email folder for the category, and the notification also including a second option to allow incoming email messages meeting the criteria to be automatically filed in the email folder,
responsive to the recipient user's selection of the first option:
generate the email folder based on the category; and
move one or more of the plurality of email messages to the email folder; and
responsive to the recipient user's selection of the second option and a receipt of a new email message meeting the criteria in the recipient user's inbox, automatically file the new email message in the email folder.

16. The computer readable storage device of claim 15, wherein determining the category comprises:
identifying one or more key terms, related terms, and contextual information in the plurality of email messages;
indexing the identified one or more key terms, related terms, and contextual information in association with an email message of the plurality of email messages from which the one or more key terms, related terms, and contextual information are identified;
determining a recurrence of a particular key term or terms related to the particular key term, or a combination of the particular key term, terms related to the particular key term and contextual information; and
determining the category based on the particular key term.

17. The computer readable storage device of claim 15, wherein determining the category to associate with the one or more of the plurality of email messages based on the criteria comprises:
assigning a confidence score for each email message of the plurality of email messages, the confidence score representing a relatedness of the email message to the category; and
associating the email message with the category when the confidence score meets or exceeds a predetermined confidence score.

18. The computer readable storage device of claim 15, including the computer readable instructions, which when executed by the processing unit is further operative to:
responsive to the recipient user's selection of the second option to allow incoming email messages meeting the criteria to be automatically filed in the email folder:
create a rule to move incoming email messages meeting the criteria to the email folder; and
apply the rule.

19. The computer readable storage device of claim 15, wherein parsing the plurality of email messages to identify the criteria comprises parsing at least one of:
an email body;
a header;
a signature; and
an attachment for:
key terms;
related terms; and
contextual information.

* * * * *